United States Patent
Murase et al.

(10) Patent No.: US 11,440,461 B2
(45) Date of Patent: Sep. 13, 2022

(54) VEHICLE HEADLIGHT CONTROL DEVICE, VEHICLE HEADLIGHT CONTROL METHOD, NON-TRANSITORY STORAGE MEDIUM

(71) Applicant: TOYOTA JIDOSHA KABUSHIKI KAISHA, Toyota (JP)

(72) Inventors: Yukimi Murase, Toyota (JP); Yoshiharu Okabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 181 days.

(21) Appl. No.: 17/097,266

(22) Filed: Nov. 13, 2020

(65) Prior Publication Data

US 2021/0253021 A1 Aug. 19, 2021

(30) Foreign Application Priority Data

Feb. 17, 2020 (JP) .............................. JP2020-023951

(51) Int. Cl.
*B60Q 1/14* (2006.01)

(52) U.S. Cl.
CPC .......... *B60Q 1/143* (2013.01); *B60Q 2300/23* (2013.01); *B60Q 2300/32* (2013.01)

(58) Field of Classification Search
CPC ............ B60Q 2300/40; B60Q 2300/41; B60Q 2300/42; B60Q 2300/43; B60Q 2300/44; B60Q 2300/23
See application file for complete search history.

(56) References Cited

U.S. PATENT DOCUMENTS 10,611,293 B2 * 4/2020 Park ....................... B60Q 1/143
10,688,911 B2 * 6/2020 Shimada ................ G06V 40/18

FOREIGN PATENT DOCUMENTS

EP 2508391 B1 10/2012
JP H08159716 A 6/1996

* cited by examiner

*Primary Examiner* — Robert J May
(74) *Attorney, Agent, or Firm* — Dickinson Wright, PLLC

(57) ABSTRACT

A vehicle headlight control device includes: an indicator value acquiring unit configured to acquire an indicator value that represents a brightness of an object detected ahead of an own vehicle; a light distribution control unit configured to control a light distribution of a headlight such that a quantity of light irradiated to the irradiation region where a dimming target object is present is reduced when the dimming target object is detected, the dimming target object being an object of which the indicator value is greater than a reference value; a reference-value varying unit configured to set the reference value to a first reference value when the object is detected within the gaze area and set the reference value to a second reference value that is greater than the first reference value when the object is detected outside of the gaze area.

7 Claims, 6 Drawing Sheets

VEHICLE HEADLIGHT CONTROL DEVICE, VEHICLE HEADLIGHT CONTROL METHOD, NON-TRANSITORY STORAGE MEDIUM

CROSS-REFERENCE TO RELATED APPLICATION

This application claims priority to Japanese Patent Application No. 2020-023951 filed on Feb. 17, 2020, incorporated herein by reference in its entirety.

BACKGROUND

1. Technical Field

The disclosure relates to a vehicle headlight control device, a vehicle headlight control method, a non-transitory storage medium.

2. Description of Related Art

There is known, as related art, a control device that causes a camera to capture an image of a region ahead of an own vehicle, detects an object (e.g., traffic sign or the like) reflecting light irradiated from headlights in the captured camera image, and controls the quantity of light irradiated from the headlights based on the brightness of the detected object, as proposed in EP2508391B1, for example.

The above-described device reduces glare sensed by the driver, by reducing the quantity of light irradiated to the object when the brightness of the detected object exceeds a reference value.

SUMMARY

However, even when the brightness of detected objects is the same, the glare that the driver senses in the reflected light from the object differs depending on the positions where the objects are detected. For example, FIG. 5 illustrates a situation where there is an object Oa present within a region A in the gaze direction of the driver (hereinafter referred to as "gaze area A"), and an object Ob that is not present within the gaze area A. The glare that the driver senses in the reflected light from the objects Oa and Ob differs. That is to say, even if the brightness of the detected objects Oa and Ob is the same, the object Oa within the gaze area A seems to have more glare to the driver than the object Ob outside of the gaze area A.

The device according to the related art uses a reference value (fixed value) set in advance, and compares the brightness of detected objects with the reference value. Accordingly, when the reference value is set in accordance with the way that the driver senses glare with regard to the object Oa that is present within the gaze area A, the timing of starting dimming of the object Ob that is outside of the gaze area A is quickened, and dimming is started even though the brightness of the object Ob is a brightness that the driver feels no need for dimming. Accordingly, even if the driver wants to see the object, the object becomes dark, and it becomes difficult for the driver to see the object.

On the other hand, when the reference value is set in accordance with the way that the driver senses glare with regard to the object Ob that is present outside of the gaze area A, the timing of starting dimming of the object Oa that is within the gaze area A is delayed, and the duration of time over which the driver senses glare with regard to the object Oa is prolonged.

Further, the position of the gaze area A changes. For example, when the gaze direction of the driver is a direction ahead of the own vehicle as illustrated in FIG. 6A, the object Oa present in the front is in the gaze area A, and accordingly the driver senses glare. On the other hand, when the gaze direction of the driver is toward the right as illustrated in FIG. 6B, the object Ob is present in the front but is not in the gaze area A, and accordingly the driver does not sense much glare. Thus, the glare that the driver senses changes depending on the direction of gaze of the driver as well.

The device according to the related art cannot deal with this change in the way that the driver senses glare.

The disclosure provides a control device that yields appropriate antiglare performance.

A vehicle headlight control device according to a first aspect of the disclosure includes: a headlight configured to irradiate light ahead of an own vehicle, and adjust a quantity of light irradiated to each irradiation region into which an irradiation range of light is sectioned; an image capturing device configured to capture an image ahead of the own vehicle; an indicator value acquiring unit configured to acquire an indicator value that represents a brightness of an object detected ahead of the own vehicle, based on the image captured by the image capturing device when light is irradiated by the headlight; a light distribution control unit configured to control a light distribution of the headlight such that the quantity of light irradiated to the irradiation region where a dimming target object is present is reduced when the dimming target object is detected, the dimming target object being an object of which the indicator value is greater than a reference value; a gaze area estimating unit configured to estimate a gaze area of a driver; and a reference-value varying unit configured to set the reference value to a first reference value when the object is detected within the gaze area and set the reference value to a second reference value that is greater than the first reference value when the object is detected outside of the gaze area.

A vehicle headlight control method according to a second aspect of the disclosure includes: irradiating light ahead of an own vehicle by a headlight configured to adjust a quantity of light irradiated to each irradiation region into which an irradiation range of light is sectioned; capturing an image ahead of the own vehicle by an image-capturing device; acquiring, by a processor, an indicator value that represents a brightness of an object detected ahead of the own vehicle based on the image captured by the image-capturing device when light is irradiated by the headlight; estimating a gaze area of a driver by the processor; setting, by the processor, a reference value to a first reference value when the object is detected within the gaze area; setting, by the processor, the reference value to a second reference value that is greater than the first reference value when the object is detected outside of the gaze area; and controlling, by the processor, a light distribution of the headlight such that the quantity of light irradiate to the irradiation region where a dimming target object is present is reduced when the dimming target object is detected, the dimming target object being an object of which the indicator value is greater than the reference value.

A non-transitory storage medium according to a third aspect of the disclosure stores instructions that are executable by one or more processors and that cause the one or more processors to perform functions comprising: acquiring an indicator value that represents a brightness of an object detected ahead of an own vehicle based on an image captured by an image-capturing device when light is irradiated by a headlight; estimating a gaze area of a driver; setting a reference value to a first reference value, when the object is detected within the gaze area; setting the reference value to a second reference value that is greater than the first reference value, when the object is detected outside of the gaze area; and controlling a light distribution of the headlight such that a quantity of light irradiated to an irradiation region where a dimming target object is present is reduced when the dimming target object is detected, the dimming target object being an object of which the indicator value is greater than the reference value.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle headlight control device according to an embodiment of the disclosure will be described below with reference to the drawings.

Figure 1:
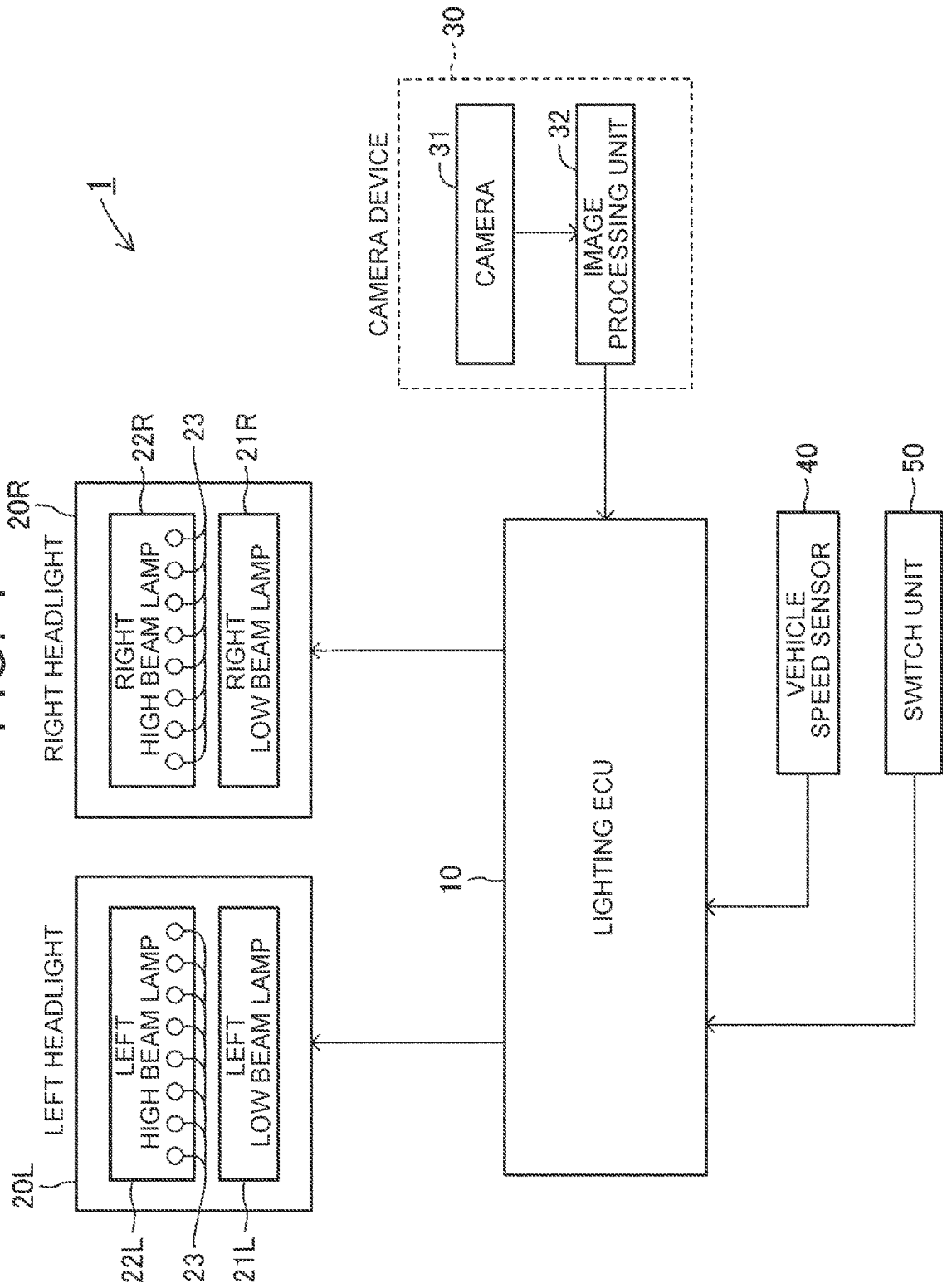
FIG. 1 is a schematic configuration diagram of a vehicle headlight control device according to an embodiment.

FIG. 1 illustrates a schematic configuration of a vehicle headlight control device 1 according to the embodiment. The vehicle headlight control device 1 is installed in a vehicle (hereinafter, may be referred to as "own vehicle" to differentiate from other vehicles). An adaptive high beam system (hereinafter, "AHS") is implemented in the vehicle headlight control device 1. AHS is a light distribution control system that performs dimming adjustment of high beams to realize varying light distribution patterns.

The vehicle headlight control device 1 is provided with a lighting electronic control unit (ECU) 10, a right headlight 20R, a left headlight 20L, a camera device 30, a vehicle speed sensor 40, and a switch unit 50.

The lighting ECU 10 is an electronic control unit that is provided with a microcomputer as a main portion. In the present specification, a microcomputer includes a central processing unit (CPU), read-only memory (ROM), random access memory (RAM), nonvolatile memory, an interface, and so forth. The CPU realizes various types of functions by executing instructions (programs, routines) stored in the ROM.

The right headlight 20R and the left headlight 20L are AHS-compatible headlights. The right headlight 20R is provided to the right side of the front end of the vehicle, and the left headlight 20L is provided to the left side of the front end of the vehicle. The right headlight 20R and the left headlight 20L are provided symmetrically in the right-left direction, and the basic configurations thereof are the same as each other.

The right headlight 20R is provided with a right low beam lamp 21R and a right high beam lamp 22R. The left headlight 20L is provided with a left low beam lamp 21L and a left high beam lamp 22L. Hereinafter, when there is no need to distinguish between the right headlight 20R and the left headlight 20L, these will be collectively referred to as "headlights 20". Also, when there is no need to distinguish between the right low beam lamp 21R and the left low beam lamp 21L, these will be collectively referred to as "low beam lamps 21", and when there is no need to distinguish between the right high beam lamp 22R and the left high beam lamp 22L, these will be collectively referred to as "high beam lamps 22". The low beam lamps 21 irradiate light to a low-beam region near the own vehicle, and the high beam lamps 22 irradiate light to a high-beam region far away from the own vehicle. The low beam lamps 21 and the high beam lamps 22 are connected to the lighting ECU 10, and lighting control of each is performed by the lighting ECU 10.

Of the low beam lamps 21 and high beam lamps 22 of the headlights 20, the high beam lamps 22 are capable of variable light distribution, i.e., light distribution control thereof can be performed. Light distribution characteristics of the low beam lamps 21 are fixed.

The high beam lamps 22 are each configured of a plurality of LED (light-irradiating diode) light sources 23 arrayed in a row in the lateral direction. The layout of the LED light source 23 can be optionally set, and may be configured with a plurality of rows of LED light sources 23 arrayed, for example. The number of LED light sources 23 making up the high beam lamps 22 may also be optionally set. Hereinafter, the LED light sources 23 will be simply referred to as LEDs 23.

The LEDs 23 making up the high beam lamps 22 are each independently connected to the lighting ECU 10 and are selectively lit by the lighting ECU 10. The amount of irradiation (quantity of light) of each LED 23 is controllable by individually adjusting the current that is applied by the lighting ECU 10. Directions of irradiation of the LEDs 23 are set to be different from each other, and light can be irradiated to the full irradiation range of the high beam lamps 22 by all LEDs 23 being lit. That is to say, the full irradiation range of the high beam lamps 22 is divided into a plurality (the same as the number of LEDs 23) in the vehicle lateral direction (right-left direction), and each of high-beam divided regions that are these divided regions is an irradiation region handled by a respective LED 23.

Accordingly, lighting only certain optionally-selected LEDs 23 enables light to be irradiated just to the irradiation regions (high-beam divided regions) of the LEDs 23 that have been lit. Also, adjusting the amount of current applied to all LEDs 23 enables the amount of irradiation of the full irradiation region of the high beam lamps 22 to be adjusted up or down. Further, adjusting the amount of current applied to certain optionally-selected LEDs 23 enables the amount of irradiation of the optionally-selected irradiation regions (high-beam divided regions) of the high beam lamps 22 to be adjusted up or down.

The camera device 30 is installed at a position where it is capable of capturing images ahead of the own vehicle from the vehicle cabin side of the windshield. The camera device 30 has a camera 31 and an image processing unit 32. The camera 31 captures images of the scenery ahead of the own vehicle at a predetermined framerate, and transmits camera images (frame images) obtained by the image capturing to the image processing unit 32. The image processing unit 32 detects (recognizes) objects present ahead of the own vehicle, based on the camera images transmitted from the camera 31, and supplies information relating to the detected objects to the lighting ECU 10 at a predetermined cycle.

For example, the image processing unit 32 recognizes the presence of vehicles traveling ahead and oncoming vehicles (referred to as "other vehicles") with lights on, by detecting taillamps of vehicles traveling ahead and headlights of oncoming vehicles based on the camera images. The image processing unit 32 also detects traffic signs, signboards, and so forth (hereinafter referred to as "display boards"), based on camera images. Such display boards have a face that reflects light irradiated from the headlights 20 of the own vehicle. Accordingly the luminance value thereof in the images is high, and the presence can be easily recognized. Also, light-irradiating objects such as guide lamps for road construction and the like have high luminance values, and thus are detected.

The image processing unit 32 also detects boundary lines to the right and left of the road (own-vehicle road) where the own vehicle is traveling, based on camera images. For example, boundary lines of the own-vehicle road are detected by road marking lines (for example, white lines). Note that curbs, guardrails, and so forth are also used for detecting boundary lines in addition to the road marking lines.

The image processing unit 32 supplies position information and luminance information of objects present ahead of the own vehicle to the lighting ECU 10 at a predetermined cycle. The position information is expressed by polar coordinates. The image processing unit 32 also supplies position information regarding the right and left boundaries of the own-vehicle road to the lighting ECU 10 at a predetermined cycle. The image processing unit 32 also recognizes the brightness ahead of the own vehicle, based on camera images, and supplies information relating to the brightness to the lighting ECU 10 at a predetermined cycle.

The vehicle speed sensor 40 detects the vehicle speed of the own vehicle (vehicle body speed), and supplies a vehicle speed signal representing the detected vehicle speed to the lighting ECU 10 at a predetermined cycle.

The switch unit 50 is provided with a lighting switch that switches between on/off of the headlights 20, a Hi/Lo switching switch to select the light distribution pattern (high beam or low beam) of the headlights 20, an automatic high beam control selection switch to select whether to perform automatic high beam control, an adaptive high beam control selection switch to select whether to perform adaptive high beam control, and a reflected-light glare-suppression control selection switch to select whether to perform reflected-light glare-suppression control.

The switch unit 50 supplies information set by setting operations performed by the driver to the lighting ECU 10. Note that these switches do not necessarily have to be integrally provided to the switch unit 50, and may be divided into a plurality. Alternatively, a configuration may be made where the switches are selected and set by operations performed at a touchscreen that is omitted from illustration. Also, the lighting switch may be an automatic switching switch using signals of an illuminance sensor that detects the illuminance around the own vehicle.

Next, description will be made regarding light distribution control that the lighting ECU 10 performs. The lighting ECU 10 performs automatic high beam control when performing automatic high beam control is selected by the automatic high beam control selection switch. This automatic high beam control is a known type of light distribution control generally called Automatic High Beam (AHB), and is performed to automatically switch the light distribution pattern while the headlights 20 are on. While automatic high beam control is being performed, the lighting ECU 10 determines whether high beam light distribution conditions are satisfied, based on the vehicle speed detected by the vehicle speed sensor 40 and the information supplied from the camera device 30 (other vehicle information and brightness information). When high beam light distribution conditions are satisfied, the light distribution pattern is set to high beam, and when high beam light distribution conditions are not satisfied, the light distribution pattern is set to low beam.

When the light distribution pattern is set to high beam, both the high beam lamps 22 and the low beam lamps 21 are on, and when the light distribution pattern is set to low beam, the high beam lamps 22 are off and only the low beam lamps 21 are on. When the headlights 20 are on, the low beam lamps 21 are always in an on state. Accordingly, on/off of the high beam lamps 22 is controlled in the automatic high beam control.

When performing adaptive high beam control is selected by the adaptive high beam control selection switch, the lighting ECU 10 performs adaptive high beam control. While performing adaptive high beam control, the lighting ECU 10 controls the light distribution of the high beam lamps 22 based on the vehicle speed detected by the vehicle speed sensor 40, and the information supplied from the camera device 30 (other vehicle information and brightness information).

When the headlights 20 are on, the low beam lamps 21 are always in an on state. Accordingly, in adaptive high beam control, the quantity of light of each of the LEDs 23 making up the high beam lamps 22 is individually controlled. While performing adaptive high beam control, the lighting ECU 10 basically sets the light distribution pattern to high beam as long as the vehicle speed is not slower than a predetermined speed and the brightness ahead is not brighter than a predetermined value. However, the lighting ECU 10 sets a light distribution pattern for the high beams that is adjusted to be dimmer depending on the situation ahead of the own vehicle.

For example, when another vehicle with lamps on is detected by the camera device 30 (a vehicle traveling ahead with taillamps on or an oncoming vehicle with headlights on), the lighting ECU 10 turns off the LEDs 23 that handle irradiating light to an irradiation region in the direction in which the other vehicle is present, such that light is not irradiated to that irradiation region. This can keep the driver of the other vehicle from being dazzled. In this situation, the quantity of light may be reduced rather than completely turning off the LEDs 23 that handle irradiating the light.

Reflected-Light Glare-Suppression Control

When performing reflected-light glare-suppression control is selected by the reflected-light glare-suppression control selection switch, the lighting ECU 10 performs reflected-light glare-suppression control. While performing reflected-light glare-suppression control, the lighting ECU 10 individually controls the quantity of light of the LEDs 23 making up the high beam lamps 22 based on information supplied from the camera device 30. Accordingly, the reflected-light glare-suppression control is performed in a state where high beam is set for the light distribution pattern.

For example, there are instances where light irradiated from the headlights 20 is reflected off of a display board, and the driver senses glare from the reflected light. The intensity of reflected light from display boards can be detected by the luminance of camera images. While performing reflected-light glare-suppression control, the lighting ECU 10 acquires position information and luminance information of detected objects, and when an object is detected where the luminance exceeds a reference value, the quantity of light irradiated to that object is reduced. Accordingly, an object of which the luminance exceeds the reference value is a dimming target object. This luminance information is information representing the luminance (cd/m²) of each pixel in the camera images, for example.

Here, the lighting ECU 10 lowers the output of the LEDs 23 that handle irradiation of light to the dimming target object by reducing the amount of current applied to these LEDs 23. Thus, the quantity of light irradiated to the dimming target object is reduced, and the intensity of reflected light from the dimming target object is weakened. Accordingly, the glare that the driver senses can be reduced. For example, the intensity of reflected light from an object detected in the distance increases as the object becomes closer to the own vehicle. When the luminance of the object exceeds the reference value in this process, this object is taken to be a dimming target object, and the quantity of light irradiated to the irradiation region where the dimming target object is present is reduced.

In the present embodiment, a reference range is set that is expressed by a range between an upper limit value and a lower limit value. This upper limit value is such a threshold value that the driver senses glare when the luminance is not lower than the upper limit value, and the lower limit value is a threshold value where the driver senses darkness and difficulty to see when the luminance is not higher than the lower limit value. When reflected-light glare-suppression control is performed, the quantity of light irradiated to an irradiation region where an object of which the luminance exceeds the upper limit value of the reference range is present (dimming target object) is reduced, and the quantity of light irradiated to an irradiation region where a dimming target object of which the luminance is below the lower limit value of the reference range due to dimming is present is increased.

Even when the luminance of detected objects are the same, the glare that the driver senses differs depending on the position where the object is detected. That is to say, even when the luminance of detected objects are the same, the driver senses more glare from an object that is within an area in the direction of gaze of the driver (referred to as "gaze area") as compared to an object outside of the gaze area. Accordingly, fixing the reference range without giving consideration to the position of an object prevents appropriate light quantity control from being performed. That is to say, the timing of starting dimming and the timing of starting increase of light cannot be appropriately set.

Accordingly, different reference ranges are each separately set for objects present within the gaze area and objects present outside of the gaze area in the reflected-light glare-suppression control according to the present embodiment. In order to do this, the gaze area in the camera image needs to be estimated.

Figure 7A:
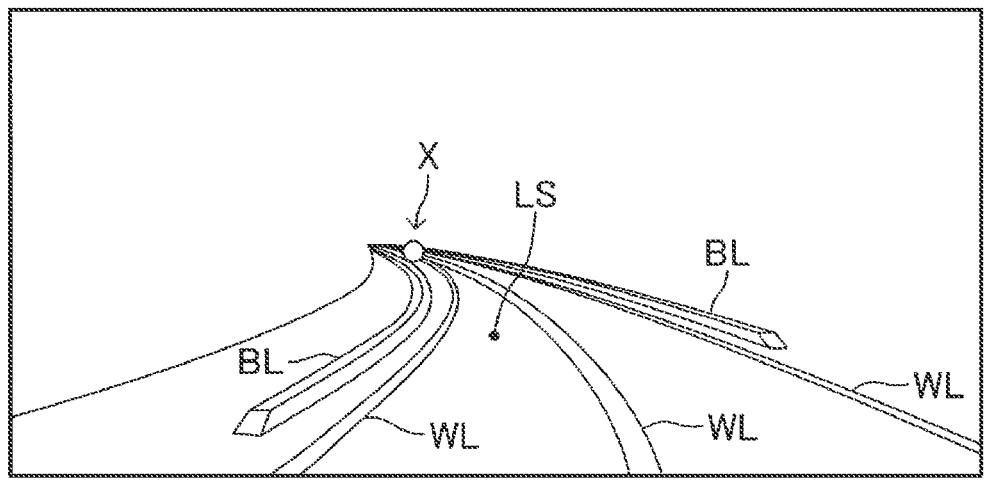
FIG. 7A is a diagram showing a camera image with a road vanishing point and a gaze area.

When estimating the gaze area, the lighting ECU 10 computes a point where an own-vehicle lane LS vanishes in the camera image, i.e., a road vanishing point X, as illustrated in FIG. 7A. In FIG. 7A, sign WL denotes white lines, and sign BL denotes curbs. Various methods of computing the road vanishing point are known. For example, a method described in Japanese Unexamined Patent Application Publication No. 8-159716 (JP 8-159716 A) can be employed. Note that information learned by machine learning (e.g., deep learning) may be used to recognize pavement regions of the own-vehicle lane LS, and the road vanishing point may be corrected based on the layout of the pavement region that is recognized.

Figure 7B:
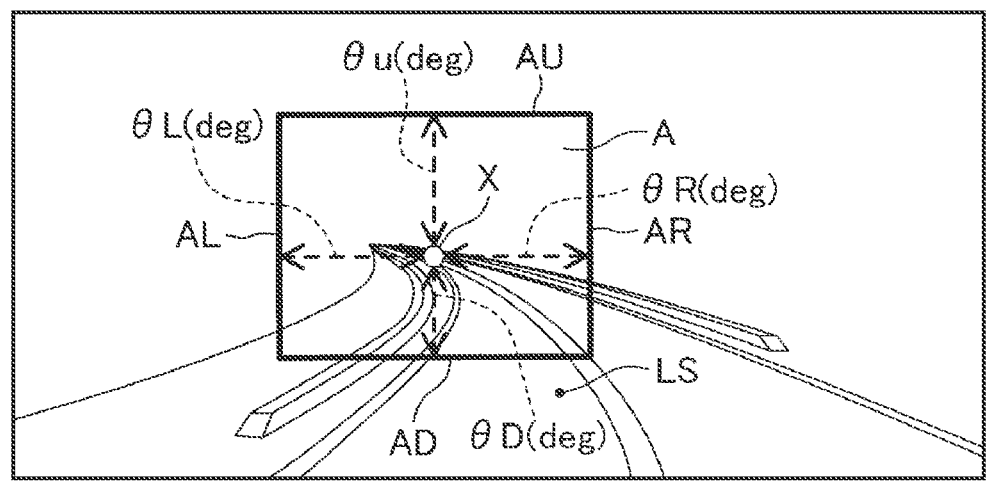
FIG. 7B is a diagram showing a camera image with the road vanishing point and the gaze area.

The lighting ECU 10 sets, in the gaze area A in the camera image, a region surrounded by a right boundary AR that is an up-down direction boundary provided in the right direction by a right boundary angle θR (deg) from the road vanishing point X, a left boundary AL that is an up-down direction boundary provided in the left direction by a left boundary angle θL (deg) from the road vanishing point X, an upper boundary AU that is a lateral-direction boundary provided in the upper direction by an upper boundary angle θU (deg) from the road vanishing point X, and a lower boundary AD that is a lateral-direction boundary provided in the lower direction by a lower boundary angle θD (deg) from the road vanishing point X, as illustrated in FIG. 7B. The right boundary angle θR, the left boundary angle θL, the upper boundary angle θU, and the lower boundary angle θD are constants set beforehand based on experimentation, simulation, and so forth. For example, the right boundary angle θR is set to the same angle as the left boundary angle θL (θR=θL), and the upper boundary angle θU is set to a greater angle than the lower boundary angle θD (θU>θD).

The lighting ECU 10 stores two values as an upper limit value Lmax of the reference range (Lmax_in and Lmax_out), and stores two values as a lower limit value Lmin of the reference range (Lmin_in and Lmin_out). The upper limit value Lmax of the reference range is set to the value Lmax_in when a detected object is present within the gaze area A in the camera image (upper limit value Lmax set to Lmax_in), and is set to the value Lmax_out when a detected object is present outside of the gaze area A in the camera image (upper limit value Lmax set to Lmax_out). The lower limit value Lmin of the reference range is set to the value Lmin_in when a detected object is present within the gaze area A in the camera image (lower limit value Lmin set to Lmin_in), and is set to the value Lmin_out when a detected object is present outside of the gaze area A in the camera image (lower limit value Lmin set to Lmin_out).

Figure 4:
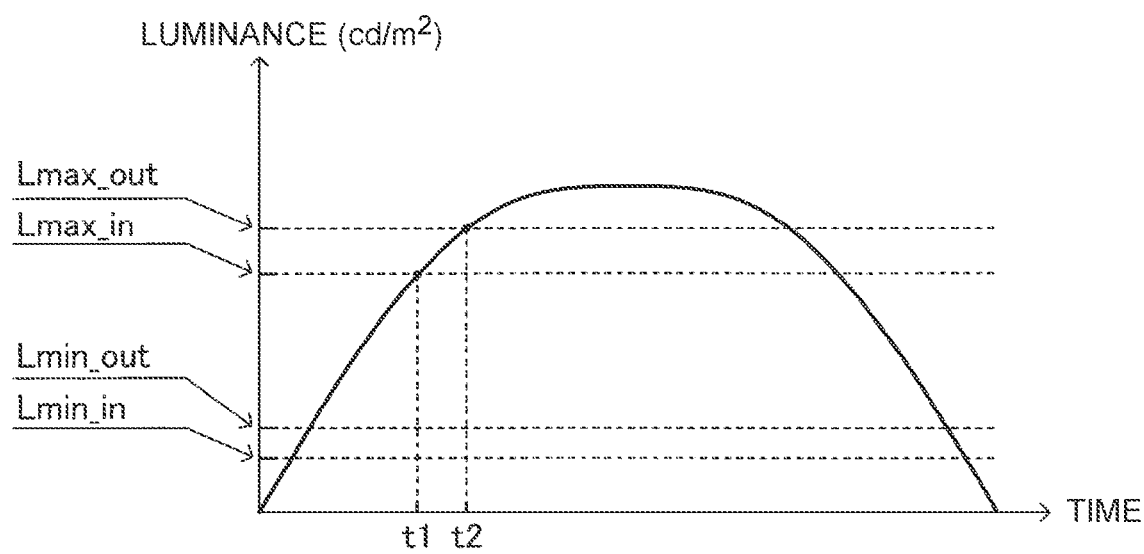
FIG. 4 is a graph showing change in luminance of an object when LED quantity-of-light control is not implemented.
Figure 5:
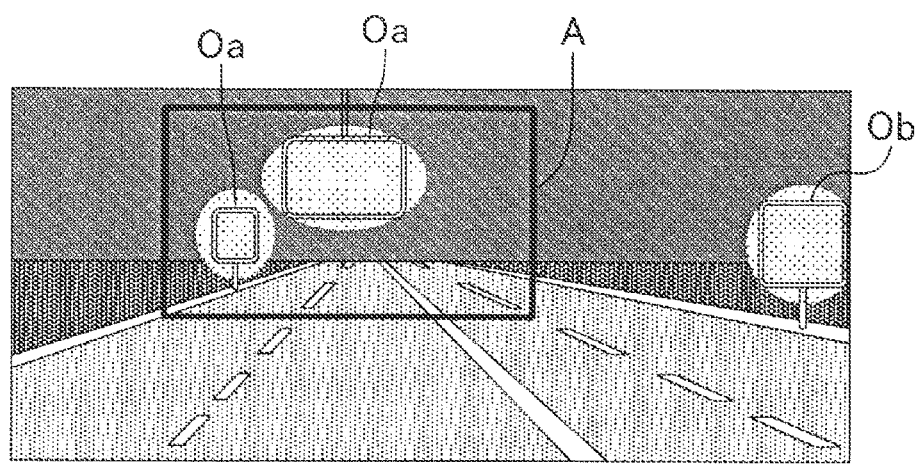
FIG. 5 is a diagram illustrating an impression of scenery ahead as seen from a driver's seat.
Figure 6A:
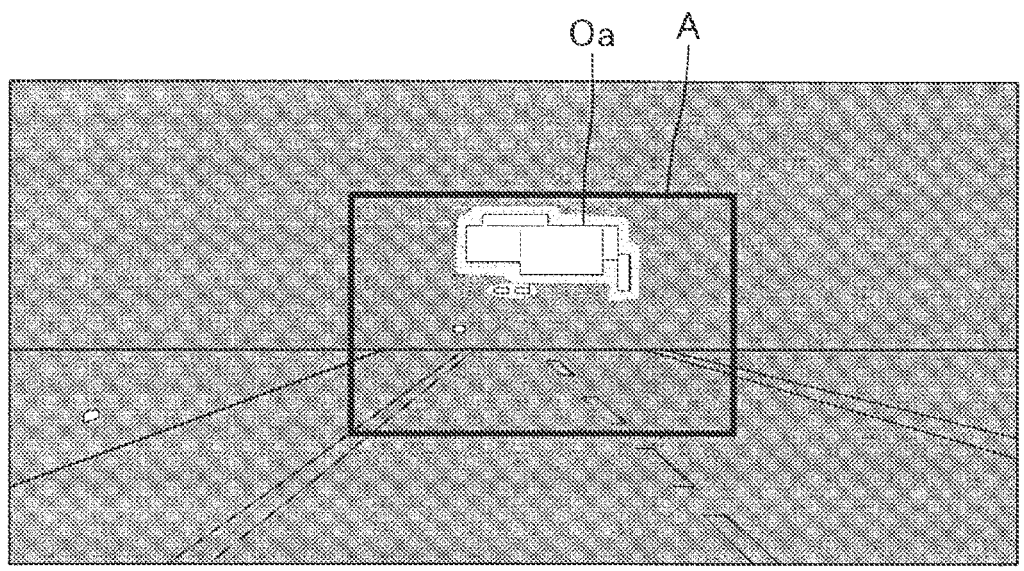
FIG. 6A is a diagram illustrating change in a gaze area.
Figure 6B:
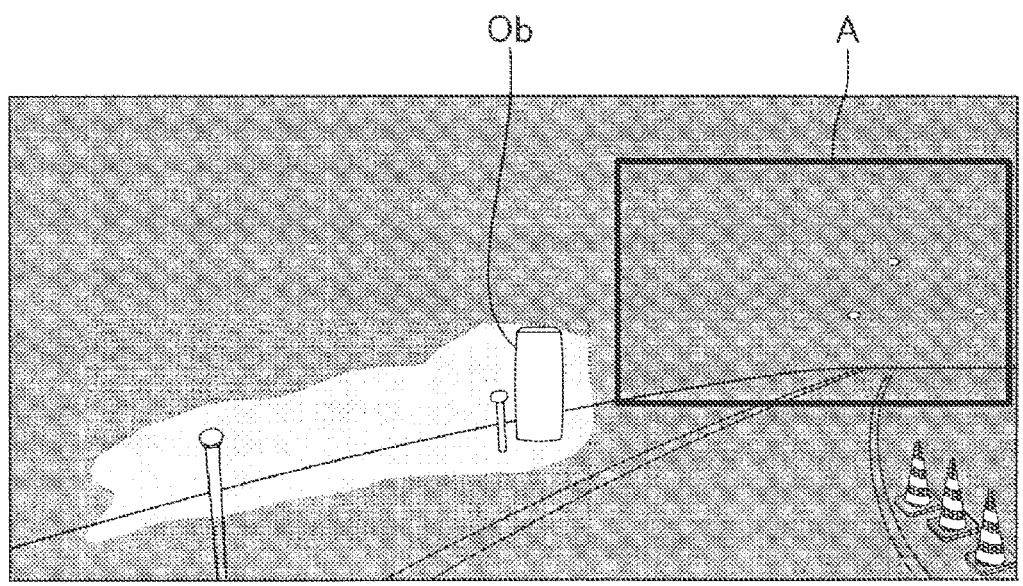
FIG. 6B is a diagram illustrating change in the gaze area.

The value Lmax_in is set to a smaller value than the value Lmax_out. The value Lmin_in is also set to a smaller value than the value Lmin_out. The relation in magnitude among the four values is Lmax_out>Lmax_in>Lmin_out>Lmin_in, as illustrated in FIG. 4.

When the luminance Lx of an object detected in the camera image is greater than the upper limit value Lmax (Lx>Lmax), the lighting ECU 10 reduces the amount of irradiation of light to the irradiation region where the object is present in steps by predetermined amounts. At this time, the lighting ECU 10 gradually reduces the amount of light irradiated from the LEDs 23 that handle irradiation of light to the irradiation region where the object is present, by reducing a target output P* of these LEDs 23 from a normal target output P0 in steps by predetermined amounts. Thus, the intensity of reflected light from the object is lowered, and the glare that the driver senses is reduced. The normal target output P0 is, for example, a target output for high beams. The control where the target output P* of the LEDs 23 is reduced as compared to the normal target output P0 in this way may be referred to as "dimming control". Also, the normal target output P0 of the LEDs 23 will be referred to as "LED normal output P0".

While performing dimming control, the target output P* of the LEDs 23 is restricted to a range that does not fall below a lower limit output Pmin.

When the luminance Lx of an object is below the lower limit value Lmin, the object is dark and visibility is low. Accordingly, when the target output P* of the LEDs 23 is reduced as compared to the LED normal output P0, the lighting ECU 10 increases the target output P* of the LEDs 23 in steps by predetermined amounts, while the luminance Lx is below the lower limit value Lmin. Thus, the brightness of the object is restored, and visibility is good for the driver.

Here, the target output P* of the LEDs 23 is increased within a limit of a range that does not exceed the LED normal output P0.

Reflected-Light Glare-Reduction Control Routine

Figure 2:
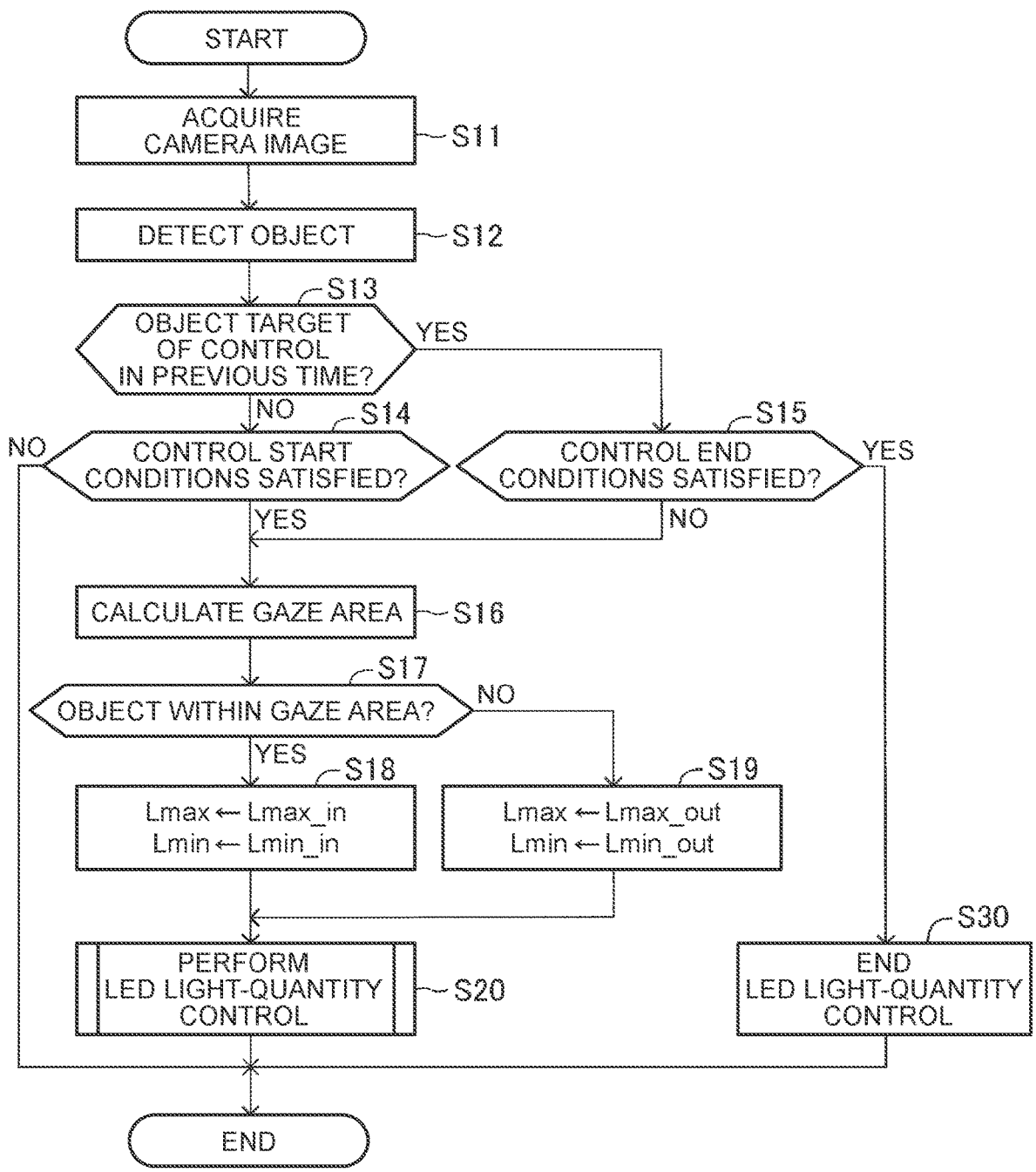
FIG. 2 is a flowchart showing a reflected-light glare-reduction control routine.

Next, specific processing regarding reflected-light glare-reduction control will be described. FIG. 2 illustrates a reflected-light glare-reduction control routine. The lighting ECU 10 repeatedly performs the reflected-light glare-reduction control routine at predetermined short computation cycles. Note that the processing in the reflected-light glare-reduction control routine also includes processing that the lighting ECU 10 and the image processing unit 32 of the camera device 30 perform in collaboration, description will be made here as processing performed by the lighting ECU 10. The way in which processing tasks are assigned to the lighting ECU 10 and the image processing unit 32 can be optionally set.

When the reflected-light glare-reduction control routine is started, the lighting ECU 10 acquires a camera image in step S11, and in the following step S12 detects objects from the camera image. These detected objects also include light-irradiating objects, in addition to objects that reflect light, but processing does not have to be performed to actively distinguish among these to exclude light-irradiating objects. Note that other vehicles are distinguished from other objects based on the brightness and the shape of head lights and tail lamps, the direction of movement, the amount of movement, and so forth, and thus are excluded from objects of detection. Information obtained by machine learning (e.g., deep learning) is used for such distinguishing.

Next, the lighting ECU 10 determines in step S13 whether the detected object is a preceding-time control target object. The reflected-light glare-reduction control routine is repeatedly performed at predetermined computation cycles. This "preceding-time control target object" represents an object regarding which later-described LED light-quantity control (S20) has been performed in the reflected-light glare-reduction control routine one computation cycle earlier.

A determination of "No" is made when activating the reflected-light glare-reduction control routine, and the lighting ECU 10 advances the processing to step S14.

The lighting ECU 10 determines whether control start conditions are satisfied in step S14. The control start conditions are conditions for starting later-described LED light-quantity control (S20). The control start conditions are set as follows.

Start condition 1. The position of an object within the camera image is within a control range (deg) that has been set beforehand. Start condition 2. The area of an object within the camera image exceeds a threshold value (pixels) set beforehand.

The control range in start condition 1 is a range where LED light-quantity control can be performed and is set to a range (deg) that is somewhat narrower than the camera image range decided by the angle of view of the camera.

The area in start condition 2 is represented by the number of pixels that have luminance of no less than a certain luminance value ($cd/m^2$) within the region of the detected object. Hereinafter, a region where the luminance is not less than the certain luminance value ($cd/m^2$) will be referred to as "high-luminance region". This certain luminance value is set to be a value larger than the value Lmin_out, for example.

The control start conditions are satisfied when the start condition 1 and the start condition 2 are both satisfied.

When the lighting ECU 10 determines in step S14 that the control start conditions are not satisfied (including a situation where no object was detected), the reflected-light glare-reduction control routine is temporarily ended. The lighting ECU 10 repeats the reflected-light glare-reduction control routine at a predetermined computation cycle.

The lighting ECU 10 repeats this processing, and when an object of which the control start conditions are satisfied is detected (Yes in S14), advances the processing to step S16. In step S16, the lighting ECU 10 computes the road vanishing point X, and sets the gaze area A based on the computed road vanishing point X.

Next, in step S17, the lighting ECU 10 determines whether the object is situated within the gaze area A. For example, the lighting ECU 10 determines whether a high-luminance region of the object is in the gaze area A. An arrangement may be made where the object is determined to be situated in the gaze area A when even just a part of the high-luminance region of the object is in the gaze area A, or where the object is determined to be situated in the gaze area A when a predetermined percentage or more of the high-luminance region of the object is in the gaze area A.

When the object is situated in the gaze area A (Yes in S17), the lighting ECU 10 advances the processing to step S18, sets the upper limit value Lmax of the reference range to the value Lmax_in, and sets the lower limit value Lmin of the reference range to the value Lmin_in. Conversely, when the object is not situated in the gaze area A, i.e., the object is situated outside of the gaze area A, (No in S17), the lighting ECU 10 advances the processing to step S19, sets the upper limit value Lmax of the reference range to the value Lmax_out, and sets the lower limit value Lmin of the reference range to the value Lmin_out. Hereinafter, the upper limit value Lmax of the reference range set as described above will be referred to as "upper limit luminance Lmax", and the lower limit value Lmin of the reference range will be referred to as "lower limit luminance Lmin".

Upon setting the values of the upper limit luminance Lmax and the lower limit luminance Lmin, the lighting ECU 10 advances the processing to step S20, and performs LED light-quantity control. This LED light-quantity control is control to adjust the amount of light irradiated to the irradiation region where the detected object is present, by controlling the output of the LEDs 23 handling irradiation of light to that irradiation region. Output control of the LEDs 23 is performed by controlling the current applied to the LEDs 23.

Figure 3:
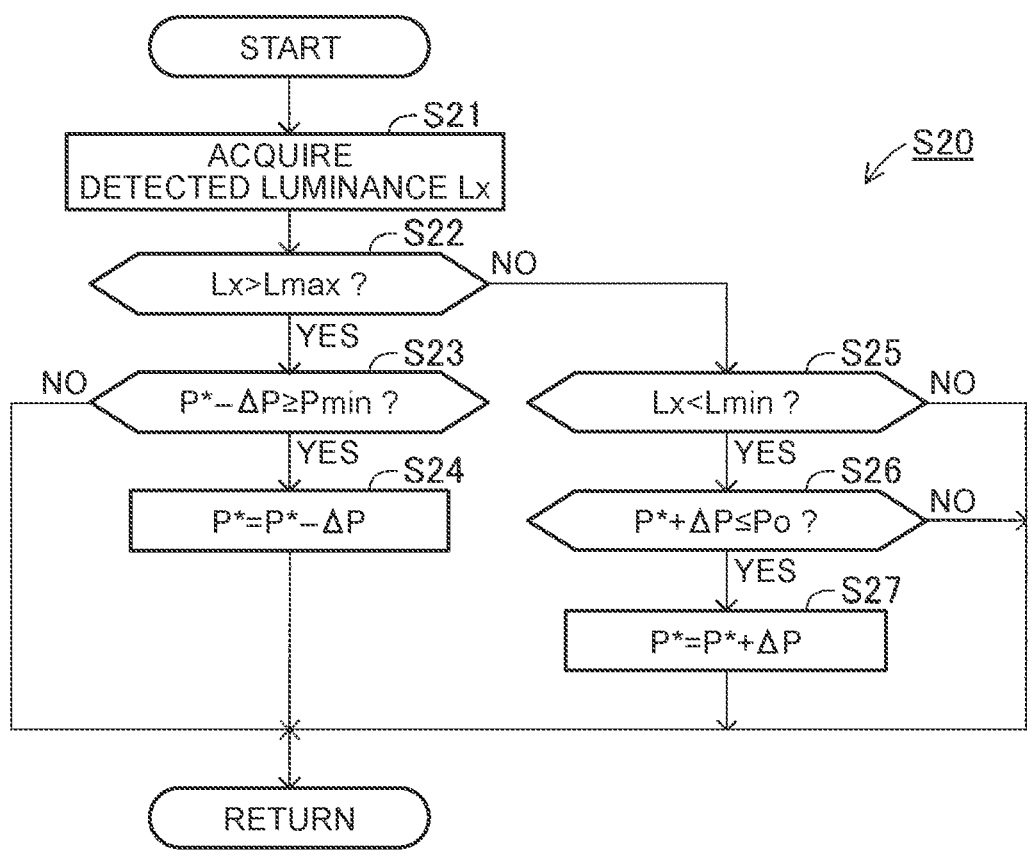
FIG. 3 is a flowchart showing an LED quantity-of-light control routine.

The LED light-quantity control in step S20 is performed following the sub-routine illustrated in FIG. 3. This LED light-quantity control will be described following overall description of the reflected-light glare-reduction control routine.

Upon performing the LED light-quantity control, the lighting ECU 10 temporarily ends the reflected-light glare-reduction control routine. The lighting ECU 10 repeats the reflected-light glare-reduction control routine at predetermined computation cycles. When an object is detected regarding which LED light-quantity control has been started (Yes in S13), the lighting ECU 10 advances the processing to step S15.

In step S15, the lighting ECU 10 determines whether control end conditions are satisfied. The control end conditions are ending conditions for the LED light-quantity control. The control end conditions are set as follows.

End condition 1. The position of the object within the camera image is outside of the control range (deg) that has been set beforehand.

End condition 2. The area of the object within the camera image is below the threshold value (pixels) set beforehand.

End condition 3. The object, which had been detected so far, is no longer detected.

The control end conditions are satisfied when at least one of the end conditions 1 through 3 is satisfied.

When determining that the control end conditions are not satisfied (No in S15), the lighting ECU 10 advances the processing to step S16 and performs the above-described processing. Accordingly, the gaze area A is recalculated (S16), and the values of the upper limit luminance Lmax and the lower limit luminance Lmin of the reference range are set based on the positional relation between the gaze area A and the object (S17, S18, S19). LED light-quantity control is then performed based on the reference range that is set.

Upon the control end conditions being satisfied after such processing being repeated, the lighting ECU 10 advances the processing to step S30 and ends the LED light-quantity control. Accordingly, normal light distribution control (e.g., high beam control) is resumed.

Note that the object detected in the camera image is not necessarily just one. When a plurality of objects are detected in the camera image, the lighting ECU 10 performs the processing of step S13 and thereafter for each of the objects.

Next, the LED light-quantity control in step S20 will be described.

The LED light-quantity control in step S20 is performed following the sub-routing illustrated in FIG. 3.

When the LED light-quantity control is started, the lighting ECU 10 acquires the detected luminance Lx of the object in step S21. The detected luminance Lx of the object is an indicator value representing the brightness of the object, and is, for example, an average value of luminance values of the pixels in the high-luminance region of the object.

Next, in step S22, the lighting ECU 10 determines whether the detected luminance Lx of the object exceeds the upper limit luminance Lmax.

When the detected luminance Lx of the object exceeds the upper limit luminance Lmax (Yes in S22), the lighting ECU 10 advances the processing to step S23, and determines whether a value ($P^*-\Delta P$), obtained by subtracting a certain value $\Delta P$ (referred to as LED output adjustment value $\Delta P$) from the LED target output $P^*$ at the current point in time, is not less than the LED lower limit output Pmin. The LED lower limit output Pmin is a lower limit value of output of the LEDs 23, set beforehand.

When the value obtained by subtracting the LED output adjustment value $\Delta P$ from the LED target output $P^*$ at the current point in time is not less than the LED lower limit output Pmin (Yes in S23), the lighting ECU 10 advances the processing to step S24, and sets the LED target output $P^*$ to the value obtained by subtracting the LED output adjustment value $\Delta P$ from the LED target output $P^*$ at the current point in time ($P^*=P^* \times \Delta P$). That is to say, when the LED target output $P^*$ is not less than the LED lower limit output Pmin even when the LED target output $P^*$ is reduced by the LED output adjustment value $\Delta P$, the LED target output $P^*$ is further reduced by the LED output adjustment value $\Delta P$.

Upon performing the processing of step S24, the lighting ECU 10 ends the LED light-quantity control and returns the processing thereof to the reflected-light glare-reduction control routine, which is the main routine. The LED light-quantity control is assembled into the reflected-light glare-reduction control routine. Accordingly, each time the LED light-quantity control ends, the reflected-light glare-reduction control routine is also temporarily ended.

The lighting ECU 10 repeatedly performs the reflected-light glare-reduction control routine at predetermined computation cycles. Accordingly, the LED light-quantity control is performed based on the reference range (upper limit luminance Lmax, lower limit luminance Lmin) calculated each time.

When the detected luminance Lx of the object exceeds the upper limit luminance Lmax (Yes in S22), the lighting ECU 10 repeats the processing of reducing the LED target output $P^*$ by the LED output adjustment value $\Delta P$ (S24). When determination is made in step S23 that the value obtained by subtracting the LED output adjustment value $\Delta P$ from the LED target output $P^*$ at the current point in time ($P^*-\Delta P$) falls below the LED lower limit output Pmin, the lighting ECU 10 skips the processing of step S24. Accordingly, when the detected luminance Lx of the object exceeds the upper limit luminance Lmax, the LED target output $P^*$ is reduced within a range of not falling below the LED lower limit output Pmin.

On the other hand, when the detected luminance Lx of the object does not exceed the upper limit luminance Lmax (No in S22), the lighting ECU 10 advances the processing to step S25. In step S25, the lighting ECU 10 determines whether the detected luminance Lx of the object is below the lower limit luminance Lmin. When the detected luminance Lx of the object is not below the lower limit luminance Lmin, the lighting ECU 10 temporarily ends the LED light-quantity control. Accordingly, the output of the LEDs 23 is not adjusted.

When the detected luminance Lx of the object is below the lower limit luminance Lmin (Yes in S25), the lighting ECU 10 advances the processing to step S26 and determines whether a value ($P^*+\Delta P$), obtained by adding the certain value $\Delta P$ (LED output adjustment value $\Delta P$) to the LED target output $P^*$ at the current point in time, is not more than the LED normal output P0.

When the value obtained by adding the LED output adjustment value $\Delta P$ to the LED target output $P^*$ at the current point in time is smaller than the LED normal output P0, this is a state where the LED target output $P^*$ is smaller than the LED normal output P0 due to dimming control, and the LED target output $P^*$ will not exceed the LED normal output P0 even if the LED target output $P^*$ is increased by the LED output adjustment value $\Delta P$. Here, the lighting ECU 10 advances the processing to step S27, and sets the LED target output $P^*$ to a value obtained by adding the LED output adjustment value $\Delta P$ to the LED target output $P^*$ at the current point in time ($P^*=P^*+\Delta P$). Upon performing the processing of step S27, the lighting ECU 10 temporarily ends the LED light-quantity control.

A situation can be conceived where, for example, the relative orientation of the display board as to the own vehicle changes or the like, after dimming control is started, and the detected luminance Lx falls below the lower limit luminance Lmin. This can be said to be a state where the output of the LEDs 23 is unnecessarily lowered. Accordingly, when the detected luminance Lx is lower than the lower limit luminance Lmin, the LED target output P* is adjusted in step S27 such that the quantity of light irradiated to the object increases.

On the other hand, when the value obtained by adding the LED output adjustment value ΔP to the LED target output P* at the current point in time exceeds the LED normal output P0 (No in S26), the lighting ECU 10 skips the processing of step S27. Accordingly, the LED target output P* is adjusted to increase within a range not exceeding the LED normal output P0.

The lighting ECU 10 repeats this processing for each object that is detected, and upon the control end conditions being satisfied, ends the LED light-quantity control (S30).

According to the vehicle headlight control device of the embodiment described above, the gaze area A of the driver is estimated, and the reference range (upper limit luminance Lmax, lower limit luminance Lmin) is set lower regarding objects detected within this gaze area A as compared to objects detected outside of the gaze area A. When the detected luminance Lx of the object exceeds the upper limit luminance Lmax, the LED target output P* of the LEDs 23 that handle irradiation of light to the irradiation region where that object is present is reduced, and the intensity of reflected light from the object is weakened.

Thus, when an object is detected within the gaze area A, the timing of reducing the quantity of light irradiated to the irradiation region where that object is present is quickened in comparison with objects detected outside of the gaze area A, and the duration of time over which the driver senses glare can be shortened. Also, when an object is detected outside of the gaze area A, the timing of reducing the quantity of light irradiated to the irradiation region where that object is present is delayed in comparison with objects detected within the gaze area A, thereby preventing excessive dimming from being performed. Accordingly, the driver can be prevented from sensing that the visibility of the object is poor. As a result, appropriate antiglare performance can be yielded according to the present embodiment.

The continuous line wave shape in FIG. 4 represents change in luminance of an object by irradiation of the headlights 20 of the own vehicle, when the own vehicle passes by the object (without LED light-quantity control being performed), for example. When the object is detected within the gaze area A, dimming control (LED light-quantity control) is started at time t1, and when the object is detected outside of the gaze area A, dimming control is started at time t2. Accordingly, the starting timing for dimming control can be set appropriately.

Also, when the detected luminance Lx of the object falls below the lower limit luminance Lmin due to performing dimming control, the LED target output P* is adjusted to be increased within a range of not exceeding the LED normal output P0. Accordingly, the quantity of light irradiated is increased, and the driver can be prevented from sensing that the visibility of the object is poor. When the object is detected within the gaze area A, the lower limit luminance Lmin is set lower than when the object is detected outside of the gaze area A, in the same way as with the upper limit luminance Lmax, and accordingly the timing of starting increase of light can be appropriately set.

Also, the gaze area A is calculated based on the road vanishing point X. The driver is presumed to be gazing at the distance in the direction of travel of the own vehicle while driving, and accordingly it is deemed in the present embodiment that the driver will be gazing at a distant position in the own lane, i.e., near the road vanishing point X of the own lane. The gaze are is set within a range within predetermined angles up and down, and right and left, centered on the road vanishing point X. Thus, the gaze area A can be appropriately set.

Although the vehicle headlight control device according to the present embodiment has been described, the disclosure is not limited to the above-described embodiment, and various types of modifications can be made without departing from the disclosure.

For example, although the light distribution pattern is controlled by adjusting the amount of current applied to the LEDs 23 in the present embodiment, an alternate configuration may be made where a movable light-shielding member is provided to the LEDs 23, and the light distribution pattern is controlled by adjusting the degree of shielding light irradiated from the LEDs 23 by operations of the light-shielding member. Also, the light source of the high beam lamps is not limited to LEDs, and other light sources may be used as well.

Although the detected luminance Lx is the average value of luminance values of the pixels in a high-luminance region of the object in the present embodiment, for example, the total value of luminance values of the pixels in the high-luminance region of the object, or the like, may be employed instead.

Although a reference range that is a range between the upper limit luminance Lmax and the lower limit luminance Lmin is set, and the LED target output P* is adjusted such that the detected luminance Lx falls within the reference range in the present embodiment, for example, an alternate configuration may be made where just the upper limit luminance Lmax is set (without setting the lower limit luminance Lmin), and the LED target output P* is adjusted only when the detected luminance Lx exceeds the upper limit luminance Lmax.

Although the gaze area is estimated based on the road vanishing point X calculated from camera images in the present embodiment, for example, an alternate configuration may be made where a driver monitor camera that captures images of the face of the driver is provided, and the direction in which the line of sight of the driver is directed is identified based on the images captured by the driver monitor camera, and the gaze area is estimated from the identified direction.

Although the gaze area A in the present embodiment is set within certain angles up and down, and right and left, centered on the road vanishing point X, for example, an alternate configuration may be made where the angular range centered on the road vanishing point X is variable in accordance with the layout of the pavement and so forth.

For example, instead of fixing the range centered on the road vanishing point X to be laterally symmetrical, an arrangement may be made where the right-side range of the road vanishing point X is larger than the left-side range (θR>θL), or conversely where the left-side range of the road vanishing point X is larger than the right-side range (θL>θR). Also, the distribution ratio of the upper-side range and the lower-side range of the road vanishing point X may be changed in accordance with the grade (up-grade, down-grade) of the own lane and so forth.

Although in the present embodiment objects detected in step S12 include light-irradiating objects such as guide lamps and so forth, for example, an arrangement may be made where light-irradiating objects and non-light-irradiating objects are distinguished and recognized by machine learning or the like, and light-irradiating objects are excluded from objects that are the target of detection.

A vehicle headlight control device according to a first aspect of the disclosure includes: a headlight configured to irradiate light ahead of an own vehicle, and adjust a quantity of light irradiated to each irradiation region into which an irradiation range of light is sectioned; an image capturing device configured to capture an image ahead of the own vehicle; an indicator value acquiring unit configured to acquire an indicator value that represents a brightness of an object detected ahead of the own vehicle, based on the image captured by the image capturing device when light is irradiated by the headlight; a light distribution control unit configured to control a light distribution of the headlight such that the quantity of light irradiated to the irradiation region where a dimming target object is present is reduced when the dimming target object is detected, the dimming target object being an object of which the indicator value is greater than a reference value; a gaze area estimating unit configured to estimate a gaze area of a driver; and a reference-value varying unit configured to set the reference value to a first reference value when the object is detected within the gaze area and set the reference value to a second reference value that is greater than the first reference value when the object is detected outside of the gaze area.

The headlight is configured to irradiate light ahead of the vehicle, and is capable of adjusting the quantity of light irradiated to each irradiation region into which the irradiation range of light is sectioned.

The image-capturing device captures the image ahead of the own vehicle, and is an onboard camera, for example. The indicator value acquiring unit acquires indicator values representing brightness of objects detected ahead of the own vehicle, based on the image captured by the image-capturing device when light is irradiated by the headlight. For example, the indicator value acquiring unit detects objects that reflect light irradiated by at least the headlight (e.g., traffic signs, signboards, etc.) based on the image captured by the image-capturing device, and acquires indicator values representing the brightness of the detected objects. Other vehicles may be excluded from the objects that are target of detection in this case. Luminance or the like, for example, may be used as indicator values representing brightness.

The light distribution control unit controls the light distribution of the headlight when a dimming target object that is an object of which the indicator value is greater than the reference value is detected, to reduce the quantity of light irradiated to the irradiation region where the dimming target object is present. For example, the brightness of an object (intensity of reflected light from the object) detected at a distance from the vehicle increases as the object approaches the own vehicle. In this process, when the indicator value becomes greater than the reference value, the object is taken as a dimming target object, and the quantity of light irradiated to the irradiation region where the dimming target object is present is reduced. Accordingly, the intensity of reflected light from the object is weakened, and glare that the driver senses can be reduced.

The gaze area estimating unit estimates the gaze area of the driver. The gaze area is an area in an image that the driver is gazing at. For example, the gaze area may be estimated based on the configuration of the own-vehicle road in images. Alternatively, a driver monitor camera may capture an image of the face of the driver, with the direction in which the line of sight of the driver is directed being identified based on the captured image and the gaze area being estimated from the identified direction.

The reference-value varying unit sets the reference value to a first reference value when the object is detected within the gaze area and takes objects of which the indicator value is higher than the first reference value to be dimming target objects, and sets the reference value to a second reference value that is greater than the first reference value when the object is detected outside of the gaze area and takes objects of which the indicator value is higher than the second reference value to be dimming target objects.

However, even when the brightness of detected objects is the same, the glare that the driver senses differs depending on the positions where the objects are detected, as described earlier. That is to say, even if the brightness of the detected objects is the same, the object within the gaze area seems to have more glare to the driver than the object outside of the gaze area. Accordingly, fixing the reference range without giving consideration to the position of the detected object prevents appropriate light distribution control from being performed. That is to say, the timing of starting dimming might not be appropriately set. In contrast with this, in the above aspect of the disclosure, when an object is detected within the gaze area, the timing of reducing the quantity of light to be irradiated to the irradiation region where the object is present is quickened as compared to that of objects detected outside of the gaze area. Accordingly, the duration of time over which the driver senses glare can be shortened.

Also, when an object is detected outside of the gaze area, the timing of reducing the quantity of light irradiated to the irradiation region where that object is present is delayed as compared to that of objects detected within the gaze area, thereby preventing excessive dimming from being performed. Thus, the driver can be prevented from sensing that the visibility of the object is poor.

As a result, appropriate antiglare performance can be yielded according to the disclosure.

In the above aspect, the gaze area estimating unit may be configured to acquire a road vanishing point of a road on which the own vehicle is traveling based on an image captured by the image capturing device, and estimate the gaze area based on the road vanishing point.

According to the above configuration, the gaze area is estimated based on the road vanishing point in the image, whereby the gaze area can be appropriately estimated.

In the above aspect, the light distribution control unit may include a dimming unit configured to reduce the quantity of light irradiated to the irradiation region where the dimming target object is present when the indicator value is greater than an upper limit value of a reference range that is the reference value, and a light-increasing unit configured to increase the quantity of light irradiated to the irradiation region where the dimming target object is present when the indicator value is lower than a lower limit value of the reference range.

According to the above configuration, when the indicator value is lower than the lower limit value of the reference range in a state where the quantity of light irradiated to an irradiation region where a dimming target object is present is being reduced, the quantity of light irradiated to the irradiation region where the dimming target object is present is increased, and accordingly, the quantity of light irradiated to the dimming target object can be made to be even more appropriate.

In the above aspect, the headlight may include a low beam lamp configured to irradiate light to a low-beam region that is a predetermined range ahead of the own vehicle, and a high beam lamp configured to irradiate light to a high-beam region including a region further ahead of the low-beam region. The headlight may be configured to irradiate light ahead of the own vehicle using at least one of the low beam lamp and the high beam lamp. The light distribution control unit may be configured to control the light distribution of the headlight when the headlight is irradiating light ahead of the own vehicle using the high beam lamp.

The light distribution control unit may be configured to detect the object detected within the gaze area as being the dimming target object when the indicator value of the object is greater than the first reference value, and detect the object detected outside of the gaze area as being the dimming target object when the indicator value of the object is greater than the second reference value.

A vehicle headlight control method according to a second aspect of the disclosure includes: irradiating light ahead of an own vehicle by a headlight configured to adjust a quantity of light irradiated to each irradiation region into which an irradiation range of light is sectioned; capturing an image ahead of the own vehicle by an image-capturing device ; acquiring, by a processor, an indicator value that represents a brightness of an object detected ahead of the own vehicle based on the image captured by the image-capturing device when light is irradiated by the headlight; estimating a gaze area of a driver by the processor; setting, by the processor, a reference value to a first reference value when the object is detected within the gaze area; setting, by the processor, the reference value to a second reference value that is greater than the first reference value when the object is detected outside of the gaze area; and controlling, by the processor, a light distribution of the headlight such that the quantity of light irradiate to the irradiation region where a dimming target object is present is reduced when the dimming target object is detected, the dimming target object being an object of which the indicator value is greater than the reference value.

A non-transitory storage medium according to a third aspect of the disclosure stores instructions that are executable by one or more processors and that cause the one or more processors to perform functions comprising: acquiring an indicator value that represents a brightness of an object detected ahead of an own vehicle based on an image captured by an image-capturing device when light is irradiated by a headlight; estimating a gaze area of a driver; setting a reference value to a first reference value, when the object is detected within the gaze area; setting the reference value to a second reference value that is greater than the first reference value, when the object is detected outside of the gaze area; and controlling a light distribution of the headlight such that a quantity of light irradiated to an irradiation region where a dimming target object is present is reduced when the dimming target object is detected, the dimming target object being an object of which the indicator value is greater than the reference value.

What is claimed is:

1. A vehicle headlight control device comprising:
   a headlight configured to irradiate light ahead of an own vehicle, and adjust a quantity of light irradiated to each irradiation region into which an irradiation range of light is sectioned;
   an image capturing device configured to capture an image ahead of the own vehicle;
   an indicator value acquiring unit configured to acquire an indicator value that represents a brightness of an object detected ahead of the own vehicle, based on the image captured by the image capturing device when light is irradiated by the headlight;
   a light distribution control unit configured to control a light distribution of the headlight such that the quantity of light irradiated to the irradiation region where a dimming target object is present is reduced when the dimming target object is detected, the dimming target object being an object of which the indicator value is greater than a reference value;
   a gaze area estimating unit configured to estimate a gaze area of a driver; and
   a reference-value varying unit configured to
     set the reference value to a first reference value when the object is detected within the gaze area and
     set the reference value to a second reference value that is greater than the first reference value when the object is detected outside of the gaze area.

2. The vehicle headlight control device according to claim 1, wherein the gaze area estimating unit is configured to
   acquire a road vanishing point of a road on which the own vehicle is traveling based on the image captured by the image capturing device and
   estimate the gaze area based on the road vanishing point.

3. The vehicle headlight control device according to claim 1, wherein the light distribution control unit includes:
   a dimming unit configured to reduce the quantity of light irradiated to the irradiation region where the dimming target object is present when the indicator value is greater than an upper limit value of a reference range that is the reference value; and
   a light-increasing unit configured to increase the quantity of light irradiated to the irradiation region where the dimming target object is present when the indicator value is lower than a lower limit value of the reference range.

4. The vehicle headlight control device according to claim 1, wherein
   the headlight includes a low beam lamp configured to irradiate light to a low-beam region that is a predetermined range ahead of the own vehicle, and a high beam lamp configured to irradiate light to a high-beam region including a region further ahead of the low-beam region,
   the headlight is configured to irradiate light ahead of the own vehicle using at least one of the low beam lamp and the high beam lamp, and
   the light distribution control unit is configured to control the light distribution of the headlight when the headlight is irradiating light ahead of the own vehicle using the high beam lamp.

5. The vehicle headlight control device according to claim 1, wherein the light distribution control unit is configured to:
   detect the object detected within the gaze area as being the dimming target object when the indicator value of the object is greater than the first reference value; and
   detect the object detected outside of the gaze area as being the dimming target object when the indicator value of the object is greater than the second reference value.

6. A vehicle headlight control method, comprising:
   irradiating light ahead of an own vehicle by a headlight configured to adjust a quantity of light irradiated to each irradiation region into which an irradiation range of light is sectioned;
   capturing an image ahead of the own vehicle by an image-capturing device;
   acquiring, by a processor, an indicator value that represents a brightness of an object detected ahead of the own vehicle based on the image captured by the image-capturing device when light is irradiated by the headlight;
   estimating a gaze area of a driver by the processor;
   setting, by the processor, a reference value to a first reference value when the object is detected within the gaze area;

setting, by the processor, the reference value to a second reference value that is greater than the first reference value when the object is detected outside of the gaze area; and controlling, by the processor, a light distribution of the headlight such that the quantity of light irradiate to the irradiation region where a dimming target object is present is reduced when the dimming target object is detected, the dimming target object being an object of which the indicator value is greater than the reference value.

7. A non-transitory storage medium storing instructions that are executable by one or more processors and that cause the one or more processors to perform functions comprising:

acquiring an indicator value that represents a brightness of an object detected ahead of an own vehicle based on an image captured by an image-capturing device when light is irradiated by a headlight;

estimating a gaze area of a driver;

setting a reference value to a first reference value, when the object is detected within the gaze area;

setting the reference value to a second reference value that is greater than the first reference value, when the object is detected outside of the gaze area; and controlling a light distribution of the headlight such that a quantity of light irradiated to an irradiation region where a dimming target object is present is reduced when the dimming target object is detected, the dimming target object being an object of which the indicator value is greater than the reference value.

* * * * *